United States Patent [19]

Aro et al.

[11] 4,132,091

[45] Jan. 2, 1979

[54] SELF LOCKING FUEL CAP

[75] Inventors: Ernesto M. Aro, Wilmington; Donald J. Shanklin, Fullerton, both of Calif.

[73] Assignee: Orion Industries, Compton, Calif.

[21] Appl. No.: 836,043

[22] Filed: Sep. 23, 1977

[51] Int. Cl.² ............................................ B65D 55/14
[52] U.S. Cl. ..................................... 70/165; 70/171; 70/413; 220/210; 220/304
[58] Field of Search ................................. 70/165–173; 220/203, 210, 303, 304, 288

[56] References Cited

U.S. PATENT DOCUMENTS

| | | | |
|---|---|---|---|
| 1,687,966 | 10/1928 | Baver | 70/173 X |
| 3,782,147 | 1/1974 | Hallmann | 70/413 X |
| 3,967,479 | 7/1976 | Vick | 70/413 X |
| 3,998,078 | 12/1976 | Detwiler | 220/210 X |
| 4,000,632 | 1/1977 | Summan | 70/165 |
| 4,000,633 | 1/1977 | Evans | 70/303 |

FOREIGN PATENT DOCUMENTS 302568 5/1929 United Kingdom ....................... 70/165

*Primary Examiner*—William Price
*Assistant Examiner*—Allan N. Shoap
*Attorney, Agent, or Firm*—Fulwider, Patton, Rieber, Lee & Utecht

[57] ABSTRACT

A fuel cap is provided for threaded engagement with a vehicle fuel tank inlet in which a locking mechanism employs a key to move a lug from a stable locking position to an unstable unlocking position. The key may be immediately removed and the fuel cap may be threadably disengaged from the inlet and thereafter reengaged therewith once fuel has been introduced into the tank. The key need not be employed to lock the fuel cap, since once manipulation of the fuel cap to threadably engage the cap with the fuel inlet is initiated, the lug is moved from the unstable unlocking position to a stable locking position. The cap may thereafter not be threadably disengaged from the fuel tank inlet unless a key is employed to again shift the lug to the unstable unlocking position. A clutch mechanism is employed to prevent overtightening of the cap and consequent damage to the cap or fuel tank inlet, yet allow sufficient tightening to effectuate a vapor tight seal between the cap and the inlet.

13 Claims, 14 Drawing Figures

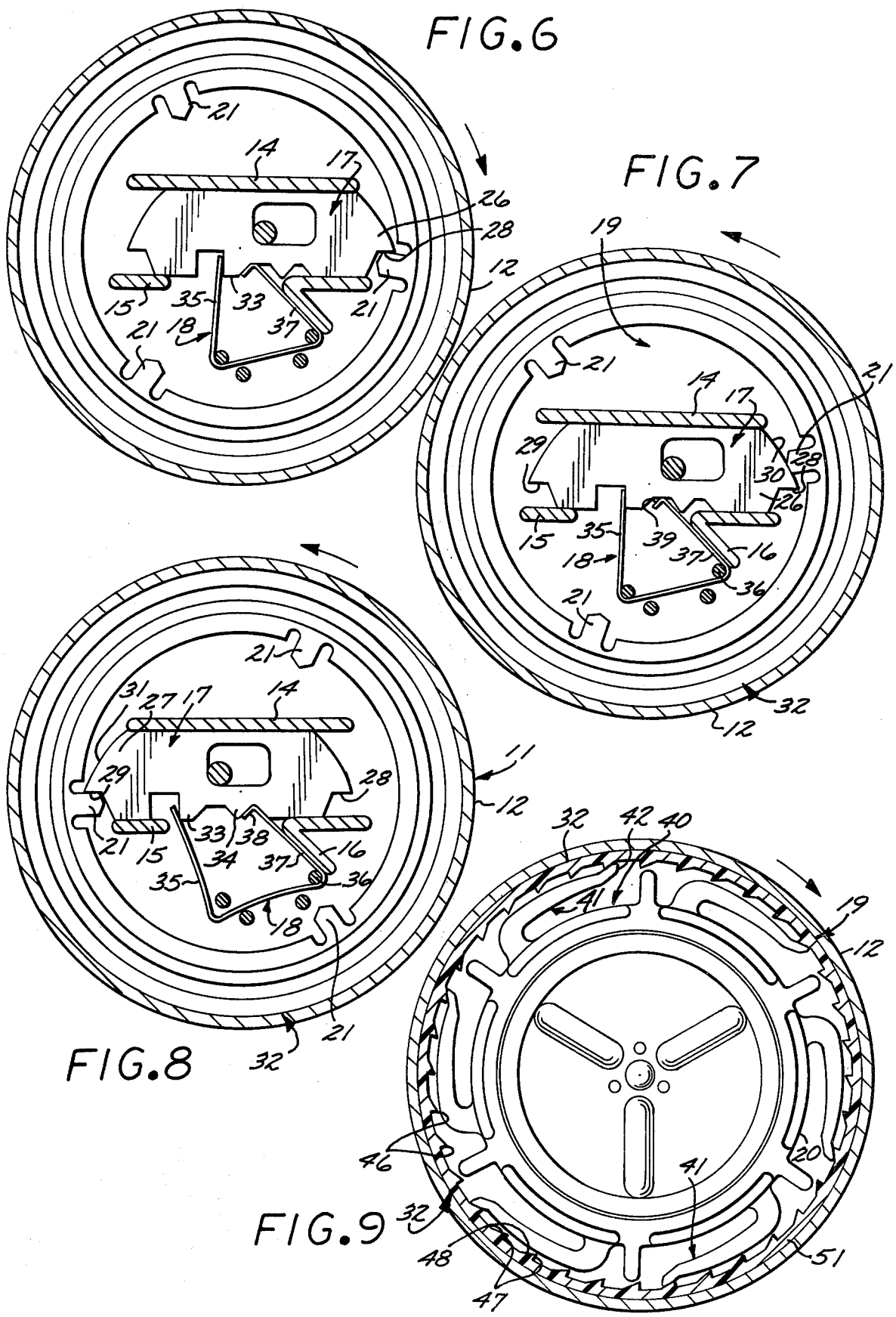

SELF LOCKING FUEL CAP

BACKGROUND OF THE INVENTION

1. Field of the Invention

The present invention relates to a threadably engageable fuel tank cap which locks in position on a fuel tank inlet, and which requires a key or other actuating mechanism to enable disengagement and removal of the cap.

2. Description of the Prior Art

In conventional systems for locking a vehicle fuel tank, a lock may either be employed in connection with an access door opening for the fuel tank which covers the cap, or a lock may be associated directly with the cap itself. The former system was previously utilized to a great extent because of the expense associated with the locking mechanism and the desirability of ensuring that the locking mechanism was secured to the vehicle, so that a cap inadvertently left off of the fuel tank by a service station attendant could be more economically replaced. However, with the pressing need for pollution control and with the concurrent need to conserve petroleum based fuels, the usage of vehicle caps with locks directly associated therewith has increased. The advantages of a locking a vehicle cap in this regard revolve around the necessity for a vapor tight seal between the fuel tank inlet and the fuel tank cap. Such a seal is conventionally formed by an O-ring interposed between the fuel tank inlet and the fuel cap. The O-ring prevents gasoline or diesel fuel vapors from escaping from the vehicle tank, thereby aiding in eliminating the escape of unburned hydrocarbons into the atmosphere. Some positive means of sealing the O-ring is required, however, and this has typically been provided by constructing the fuel tank cap and fuel tank inlet for threaded engagement with each other.

Conventional mechanisms for locking vehicle fuel tank caps have suffered from several disadvantages. Conventional fuel tank cap construction involves the necessity for turning a key in a lock in one direction, usually counterclockwise to unlock the cap. The key must thereafter be turned in the opposite direction to lock the cap to the fuel tank inlet. Thus, the cap is usually rotated counterclockwise with the key in the lock and rotated in the opposite direction, also with the key in the lock. This is particularly cumbersome and unwieldly since the fuel tank cap key is typically carried as a part of a key ring, chain or key purse and hence presents a considerable inconvenience in manipulating the cap to threadably loosen and tighten it with keys hanging from the lock. An alternative manner of manipulation is to withdraw the key from the lock subsequent to unlocking the cap, threadably disengaging the cap, filling the tank, and threadably re-engaging the cap with the fuel tank inlet. The key is again inserted to lock the cap in position. This also is inconvenient in that it requires the insertion of the key twice into the lock to complete the procedure.

It is an object of the present invention to provide a self-locking fuel tank cap, which requires but a single key manipulation that can be completed entirely prior to any loosening or tightening of the vehicle tank cap. Thus, when the manipulation of the key is complete the key can be withdrawn. The key thereby does not present a hindrance to rotating the cap nor is there a required reinsertion of the key to effectuate locking.

A further advantage of the present invention, as contrasted with other fuel tank locking caps, is that only four major assemblies are required. The principal components are a tank cover with a key mechanism associated therewith, a lug bolt transversely movable relative to the cover, a biasing spring arrangement, and a central core for threadable engagement with the fuel tank inlet. Other locking fuel tank caps require anywhere from eight to twelve major components.

A further feature of the present invention is the deployment to advantage of a clutch mechanism to allow a vehicle tank cap to be threadably engaged with the tank inlet to a sufficient degree to effectuate sealing of the inlet yet to allow disengagment of the cover from the central core to prevent overtightening. Conventional systems are dependent upon the resistance felt by the individual twisting the vehicle tank cap onto the tank inlet to ascertain when sealing has been effectuated. By utilizing the clutch mechanism of the present invention, subjectivity in determining the proper degree of engagment is eliminated. Rather, the cover can be rotated clockwise to tighten the cap onto the inlet until the clutch mechanism begins to slip. This can be felt by the individual closing the fuel inlet and always occurs at the same upper limit of torsional force between the cover and the central core. Thus, the cap can be systematically and repetitively sealed to the vehicle fuel inlet without damage or danger to the structural components of either.

DESCRIPTION OF THE DRAWINGS

FIG. 6 is a sectional view taken along the line 6—6 of FIG. 3 and illustrating the coaction of the lug and latching mechanism during tightening of the fuel tank cap on the tank inlet;

FIG. 7 is a view similar to FIG. 6 showing the coaction of the lug with the latching mechanism during attempted loosening of the cap on the fuel tank inlet with the lug in the stable locking position;

FIG. 8 is a view similar to FIG. 6 illustrating the coaction of the lugh and latching mechanism while loosening the cap from the fuel tank inlet with the lug in the unstable unlocking position; and FIG. 9 is a sectional plan view of the clutch mechanism taken along the lines 9—9 of FIG. 3.

DESCRIPTION OF THE EMBODIMENT

Figure 1:
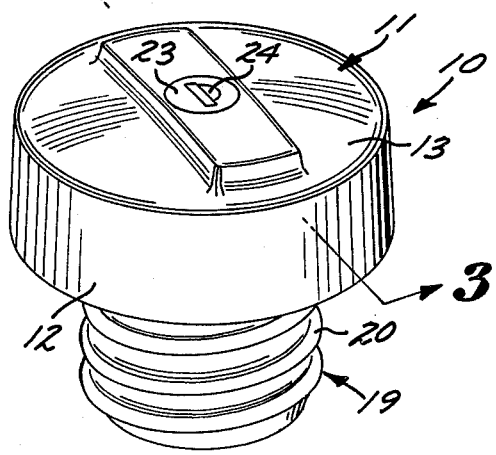
FIG. 1 is a perspective view of the selflocking vehicle cap of the invention.
Figure 2:
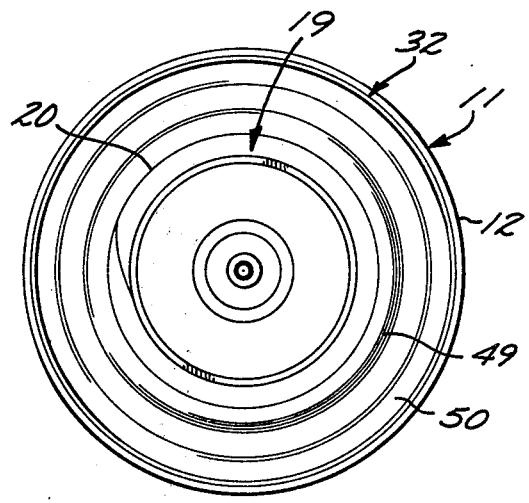
FIG. 2 is a plan view of the underside of the fuel tank cap of FIG. 1.
Figure 4:
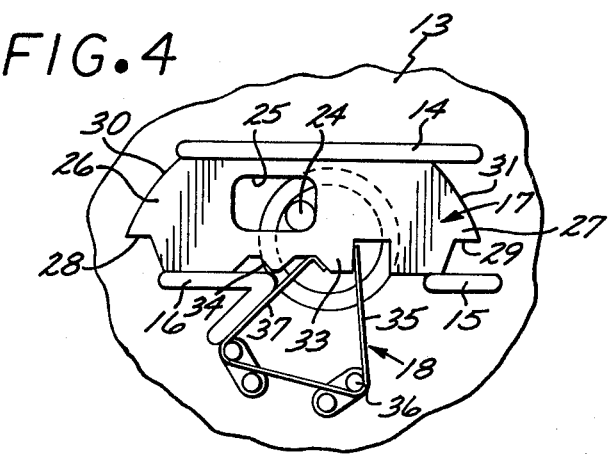
FIG. 4 is a sectional view taken along the lines 4—4 of FIG. 3 and illustrating the lug of the fuel cap in the stable locking position.
Figure 5:
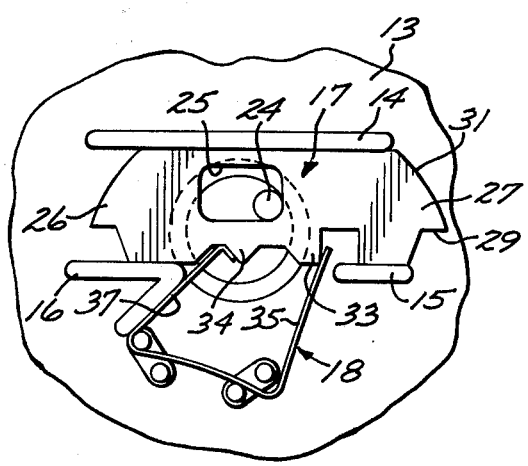
FIG. 5 is a view similar to FIG. 4 illustrating the lug in the unstable unlocking position.

FIG. 1 illustrates one embodiment of a self locking vehicle tank cap 10 for closing a gas tank filler spout. The cap 10 is formed by a cover 11 having a circular end wall 13 having an annular skirt 12 projecting outwardly therefrom to encircle the filler spout in coaxial fashion. The end wall 13 is equipped on its interior surface with a chordal guideway formed by laterally spaced apart parallel ridges 14, 15 and 16 as illustrated in FIGS. 4 and 5. The guideway defines a transverse path across the diameter of the cap for a lug 17 to slide adjacent to the end member 13. Movement of the lug 17 in the path defined by the guideway is best illustrated in FIGS. 4 through 8 which depict different positions to which the lug 17 may be moved in a reciprocating fashion along the guideway.

The lug 17 may be moved from a stable locking position of FIG. 4, in which counterclockwise rotation of the cap 10 as viewed in FIG. 1 will not result in disengagement of the threads 20 from a filler spout, to the unstable unlocking position of FIG. 5, in which such disengagement can be achieved. A resilient biasing means is provided in the form of an elongated leaf spring 18 bent with opposing legs that almost meet and formed generally in the shape of a triangle. The opposing legs act in opposite directions on the lug 17. One of the legs tends to urge the lug 17 from the unstable unlocking position of FIG. 5 to the stable locking position of FIG. 4, but the other leg opposes unaided movement of the lug 17 in this manner. Movement of the lug 17 to the stable position from the unstable position may be aided however, by interaction with a barrel assembly 19 during clockwise rotation of the cover 11 as viewed in FIG. 1.

Figure 3:
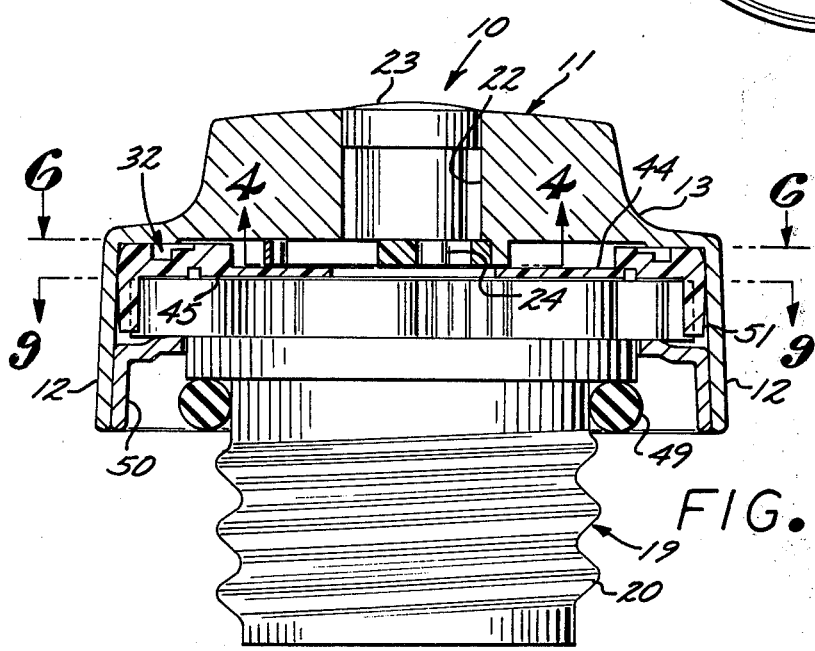
FIG. 3 is a sectional elevational view taken along the lines 3—3 of FIG. 1.

Referring to FIG. 3 the axially projecting barrel assembly 19 is housed beneath the cover 11 and has a lower cylindrical portion formed with exterior coarse threads 20 for coaxial engagement with a fuel tank filler spout. At its upper end, the barrel assembly 19 has a generally disk shaped latching ring 32 located next to the end wall 13 of the cover 11 with an annular lip 51 extending coaxially a short distance and encircled by the annular skirt 12 of the cover 11. Located on the upper disk shaped surface of the latching ring 32 facing the end wall 13 are a plurality of radially inwardly directed catches 21 that form a latching mechanism for coaction with opposing ends of the lug 17.

Rotation of the cover 11, and hence the lug 17 relative to the catches 21 in the direction opposite to the arrow in FIG. 8 with the lug 17 initially in the unlocking position depicted in FIG. 8 causes one of the catches 21 to engage a rounded end of the lug 17 and force it away. That is, rotation of the cap 11 in this manner carries the lug 17 in rotation until the curved surface 31 contacts one of the catches 21. Continued rotation of the cover 11 forces the lug 17 away from the catch 21 with which contact is made, thereby aiding the leaf spring 18 to drive the lug 17 toward the stable locking position of FIG. 6. On the other hand, rotation of the cover 11, and hence the lug 17, in the direction of rotation indicated by the arrow in FIG. 8 with the lug 17 initially in the unlocking position as indicated causes the lug 17 to latch against one of the catches 21 and to carry it in rotation therewith, thereby rotating the latching ring 32 in the direction of the arrow in FIG. 8. Unless the lug 17 is in the unstable unlocking position depicted in FIG. 8, however, rotation of the cover 11 in a counterclockwise direction, as viewed in FIG. 1, will not result in engagement of the barrel assembly 19 therewith, although clockwise rotation of the cover 11 will result in such engagement.

The cover 11 is a case aluminum shell, preferably with chrome plating on its exterior surfaces for corrosion protection and for enhancement of appearance. The cover 11, as depicted in FIG. 3, includes an axial bore 22 through the end wall 13 to receive a lock cylinder 23. A key for unlocking the fuel tank cap 10 may be inserted in the key slot 24 of FIG. 1. The key is rotated within the cylinder 23 to overcome the bias of the tumbler springs (not shown) in a conventional manner and thereby allow the key and cylinder 23 to be rotated as a unit within the aperture 22. A longitudinally directed eccentric crank pin 24 extends inwardly from the cylinder 23 and is received in an oversized aperture 25 defined in the lug 17 as depicted in FIG. 4. Thus, a key is employed to drive the axially offset crank pin 24 in rotation and the crank pin 24 acts against the walls of the aperture 25 of the lug 17 to shift the lug 17 from one position to another along the guideway defined between the ridges 14, 15 and 16.

The lug 17 is a generally flat oblong member having opposing ends 26 and 27 which respectively have curved edge surfaces 30 and 31 that curve toward each other in converging fashion until abruptly terminated in a straight edge surface that rides against the ridge 14, as viewed in FIGS. 4 through 8. Opposite the curved surfaces 30 and 31, the ends 26 and 27 of lug 17 are formed in a stepped configuration with longitudinal bearing surfaces or ledges 28 and 29 respectively. Thus the bearing ledges 28 and 29 at the ends 26 and 27 respectively join the outwardly facing curved camming surfaces 30 and 31 located adjacent thereto. Opposite the straight edge surface 14 of lug 17 is an opposing edge that is restrained by the guides 15 and 16 and which is shaped in a stepped configuration with a transverse projecting impelling tooth 33 and a transverse projecting restraining tooth 34. The tooth 33 is shaped with one inclined surface and with one surface perpendicular to the guideway within which the lug 17 moves. The impelling tooth 33 is engaged by an impelling leg 35 of the biasing spring 18 which acts upon the surface perpendicular to the guideway as illustrated in FIGS. 4 through 8. The leg 35 of the spring 18 rides freely in contact with the impelling tooth 33 and is frequently in a deflected condition to urge the lug 17 to the right and toward the stable locking position as viewed in FIGS. 6 through 8. The restraining tooth 33 is shaped as an isosceles triangle with opposing inclined surfaces. A restraining leg 37 of the spring 18 acts against one of the inclined surfaces when the lug 17 is in the unstable unlocking position of FIG. 5 to prevent the biasing leg 35 from forcing the lug 17 toward it.

As previously indicated, the spring 18 is of generally triangular configuration in an undeformed state. The spring 18 includes a linear impelling leg 35 immmobilized at one end relative to a fulcrum 36 on the cover 11, as depicted in FIGS. 7 and 8. The spring 18 also has an opposing restraining leg 37 formed in an L-shaped configuration and which terminates in a foot deformed as at 38 to provide a bearing surface 39 for acting against the impelling tooth 33 when the lug 17 is in the stable locking position of FIGS. 4 and 6. When the lug 17 is in the stable position, the spring leg 37 is positioned in contact with the inclined surface of the impelling tooth 33 while the impelling spring leg 35 acts against the opposite face of the tooth 33 to urge the lug 17 toward the restraining leg 37. When the lug 17 is in the unstable unlocking condition of FIGS. 5 and 8, however, the foot 38 of the restraining spring leg 37 acts against one inclined surface of the restraining tooth 34, while the impelling leg 35 of the spring 18 acts against the impelling tooth 33 to urge the lug 17 toward the restraining leg 37. However, because of the opposition to movement of the restraining leg 37 on the restraining tooth 34, the lug 17 will not move in response to the unaided force of the impelling leg 35. In this connection it is significant that when one of the catches 21 acts upon the curved surface 31 of the end 27 of lug 17, the effect of the impelling spring 35 is aided sufficiently to deflect the restraining spring leg 37 and cause it to ride over the restraining tooth 34. This shifts the lug from the unstable unlocking position of FIG. 5 to the stable locking position of FIG. 4.

As depicted in FIG. 3 the central barrel 19 has an annular portion with coarse right-hand threads 20 for engagement with the filler spout of a fuel tank. At the neck of the threaded portion 20 a toroidal O-ring 49 encircles the barrel 19 for coaction with a mating threaded fuel filler spout to effectuate a seal between the barrel assembly 19 and the filler spout. Outwardly from the O-ring 49 a retaining ring 50 is forced fitted into the skirt 12 of cover 11 to secure the barrel assembly 19 to the cover 11. Above the retaining ring 50 of the barrel assembly 19 is a toothed collar 40 that includes a plurality of elongated teeth 41 mounted in cantilever fashion relative to the collar 40 and extending in generally arcuate configurations to terminate in radially inclined tips 42, as illustrated in FIG. 9. The annular latching ring 32 fits over the top of the collar 40 with the lip 51 encircling the collar 40. The latching ring 32 carries interiorly directed ratchet teeth 46 extending inwardly from the lip 51. The ratchet teeth 46 are engageable with the ratchet teeth 41 of the collar 40. The interior collar 40 and the peripherally surrounding latching ring 32 are thereby engaged until excessive torsion therebetween deflects the outward directed teeth 41 in FIG. 9 to cause disengagement of the collar 40 from the lip 51.

It should be noted that the radially directed teeth 46 which are disposed in mating orientation relative to the teeth 41 have radial surfaces 47 and inclined surfaces 48. Thus, the tips 42 of the teeth 41 are able to ride on the inclined surfaces 48 in engagement therewith as the filler cap 10 is engaged on a fuel tank inlet. When the cap 10 is tightened to a predetermined degree, the teeth 41 ride to the peaks of the inclined surfaces 48 and drop to the nominal interior diameter of the lips 51 of the latching ring 32. This allows the teeth 41 to become disengaged from the latching ring 32 when torsional force exceeds a predetermined upper limit. However, when rotation is in the opposite direction, the tips 42 of the teeth 41 abut the radial surfaces 47 of the inwardly directed teeth 46 so that there is no liklihood for disengagement of the teeth when the fuel cap 10 is to be removed from the fuel tank inlet. Together the toothed lip 51 of the latching ring 32 and the toothed collar 40 of the barrel assembly 19 form a clutch which does not prevent disengagement of the cap from the fuel inlet even though the cap has been tightened to its upper limit. However, as the fuel cap 10 is tightened relative to the fuel tank inlet, an upper limit of torsional force is reached beyond which the latching ring 32 disengages from the barrel assembly 19 so that further engagement of the barrel assembly 19 with the filler tank inlet is precluded.

An alternative embodiment of the invention is depicted in FIGS. 10-14. A self locking gas cap 110 of shorter profile than that of the cap 10 is provided. The self locking gas cap 110 includes a cover 111 with a disk-shaped end wall 113 slightly convex outward at the center and including a low shoulder 60. The outer perimeter of the end wall 113 is turned downward to form an annular skirt 112 which encircles the filler spout in coaxial fashion. A retaining ring 51 is force fitted into interior of the skirt 112 to entrap the barrel assembly 119.

Figure 10:
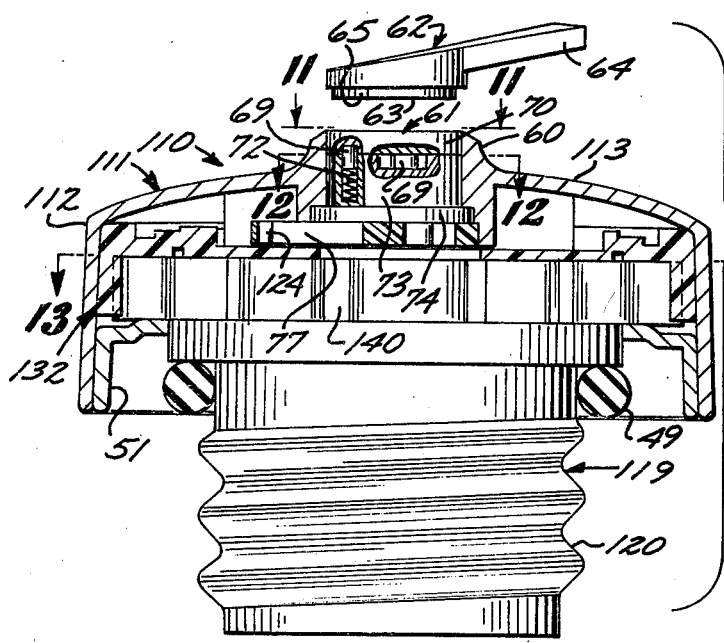
FIG. 10 is a sectional elevational view of another embodiment of the self locking vehicle cap of the invention.

The self locking gas cap 110 includes a magnetic lock mechanism indicated at 61 which is operated by a magnetic key 62 depicted in FIG. 10. The magnetic key 62 includes a disk shaped portion having a lower face 63 above which a series of magnets are spaced at predetermined positions in a circle within the confines of the key 62. A handle 64 extends from the disk shape portion of the key 62 and a notch 65 is formed in the disk shape portion to receive a mating stud 66 projecting radially inward above a flat, otherwise circular surface 67 surrounded by an annular rim 68 at the upper extremity of the shoulder 60 of end wall 113. The key 62 can thereby be seated with the flat surface 63 of the disk shaped portion in contact with the flat circular surface 67 only when the stud 66 is engaged in the notch 65.

Figure 12:
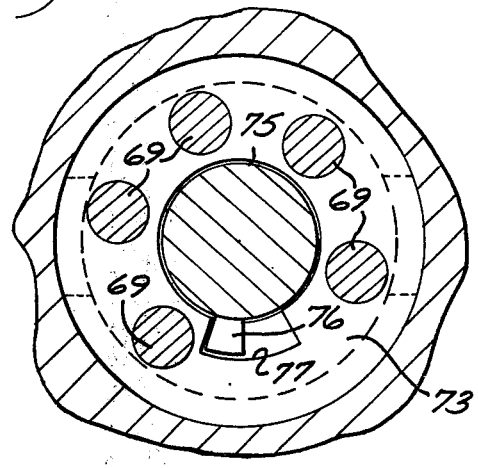
FIG. 12 is a sectional plan view taken along the lines 12—12 of FIG. 10.

The magnets located above the surface 63 within the confines of key 62 are spaced in a circle, but at predetermined arcuate intervals such that the spacing between magnets forms a code. When the key 62 is inserted in the proper magnetic lock assembly 61, the arcuate spacing of magnets within the key 62 and the polarity of orientation of the magnets is such that the magnets within the key 62 are aligned with and repel corresponding magnets 69 within the lock 61, which are depicted in FIGS. 10 and 12. Among different locks, the spacing between the magnets 69 and the orientation of these magnets is such that only keys 62 with the appropriate code of corresponding spacing between magnets located therein and with like poles adjacent to the surface 63 will open the particular lock 61.

Figure 11:
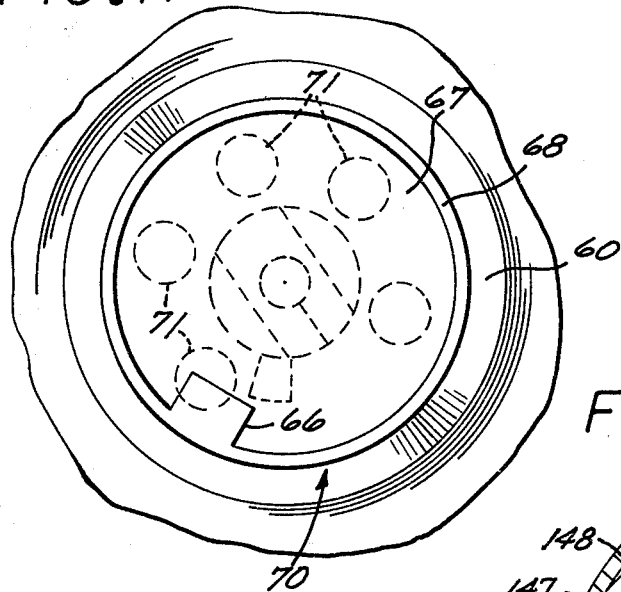
FIG. 11 is a plan view taken along the lines 11—11 of FIG. 10.

As depicted in FIG. 11, the lock 61 includes an upper exposed pan shaped portion 70 having a rim 68 with the stud 66 directed radially interiorly therefrom above the otherwise circular floor 67. The underside of the pan-shaped structure 70 includes a plurality of upwardly directed circular depressions 71 which are spaced from each other at intervals along a circle corresponding to the arrangement of magnets 69 depicted in FIG. 12. Thus, with the key 62 in position, the forces of magnetic repulsion of the magnetics located within the key 62 force the magnets 69 downward out of the depressions 71 in the underside of pan shaped structure 70, when the pan-shaped structure 70 is rotated so that the magnets 69 are aligned with the depressions 71. When aligned with the depressions 71, the magnets 69 would otherwise be biased upward and received within the depressions 71 by virtue of the springs 72 depicted in FIG. 10. In the absence of a properly coded key 62, the magnets 69 in depressions 71 serve as bolts extending into latch receptacles formed by the depressions 71. This renders the pan-shaped structure 70 immobile and prevents rotation thereof relative to the cover 111.

With a proper key 62 in position, the pan-shaped structure 70 may be rotated within the confines of the annular shoulder 60. The annular drum-shaped housing 73 for the magnets 69 is located beneath the pan-shaped structure 70 and is always immobile relative to the shoulder 60. The drum shaped housing 73 is attached to an annular disk shaped platform 74 which is used to mount the housing 73 relative to the shoulder 60. From the center of the underside of the pan-shaped structure 70, a shaft 75 extends axially downward. The shaft 75 is of circular cross-section beneath the pan-shaped structure 70 as well as beneath the platform 74. Adjacent to the underside of the pan shaped structure 70, a boss 76 extends radially outward from the shaft 75 and may be moved within the confines of a short arcuate transverse track 77 in the housing 73, as depicted in FIG. 12. This in turn limits the rotational movement of the pan-shaped structure 70. The limitation in rotation of the pan-shaped structure 70, from which the shaft 75 depends, by means of the interaction of the boss 76 within the track 77 prevents the pan shaped structure 70 from being turned to far, and thus accidentally aligning the magnets in the key 62 with the magnets 69.

Figure 14:
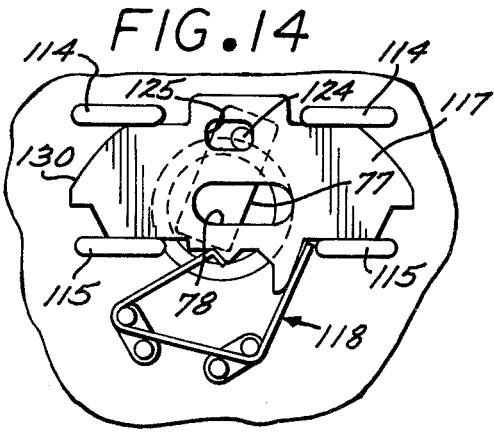
FIG. 14 is a view from the underside of the lug of the embodiment of the fuel cap of FIG. 10 illustrating the lug of the embodiment of the fuel cap of FIG. 10 illustrating the lug in the unstable unlocking position, similar to the view of FIG. 5.

Below the platform 74, a crank arm 77 is journaled onto the shaft 75 and extends radially therefrom. An eccentric crank pin 124 extends downward from the crank arm 77 parallel to the lock axis and acts within the enlarged aperture 125 in lug 177 as depicted in FIG. 14.

Operation of the lug 117 within the guides 114 and 115 is identical to the operation of the lug 17 of the gas cap 10 explained in conjunction with FIGS. 1 through 9. A leaf spring 118 likewise operates identically in function to the leaf spring 18 in the embodiments of FIGS. 1 through 9. The only difference in function of the lug 117 from the lug 17 is that an aperture 78 is provided near the center of the lug 117 to accommodate the upward protrusion of the pressure relief valve 79 depicted in FIG. 13. The necessity for obviating the interfering operation of these parts results from the lower profile of the gas cap 110.

Figure 13:
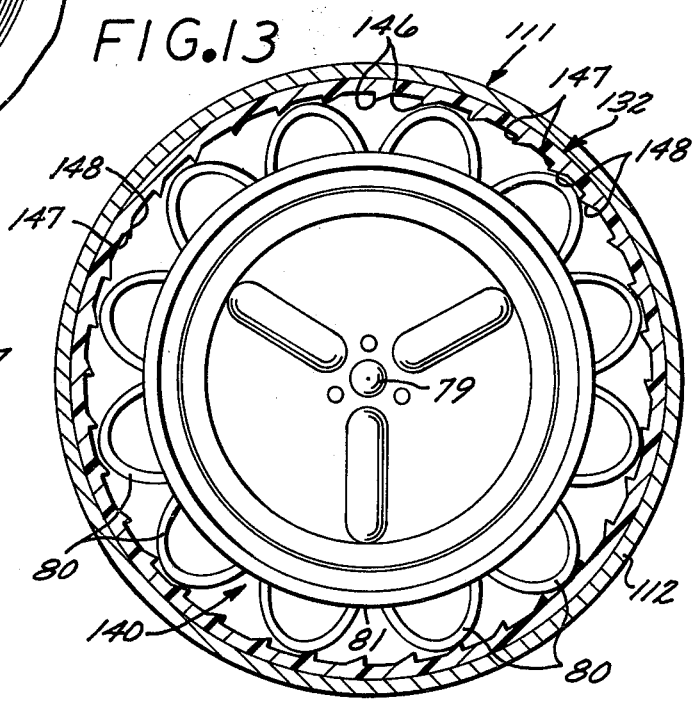
FIG. 13 is a sectional plan view of the underside of the clutch mechanism of FIG. 10 taken along the lines 13—13—13 of FIG. 10.

A different form of clutch mechanism is employed in conjunction with the gas cap 110 than with the gas cap 10 of FIGS. 1 through 9. This clutch mechanism is depicted in FIGS. 10 and 13. As illustrated in FIG. 10, the central barrel 119 of cap 110 has an annular portion with course righthand threads 120. Above the threads 120 an O-ring 49 is provided for effectuating a seal with the fuel tank filler spout. Above the O-ring, the barrel assembly 119 forms a collar 140 having an outer surface shaped with radial ridges 80 and valleys 81 therebetween running parallel to the cap axis. The ridges 80 coact with radially interiorally directed ratchet teeth 146 which are mounted on an annular latching ring 132. The ratchet teeth 146 have radial surfaces 147 and inclined surfaces 148.

In the operation of the clutch mechanism as viewed in FIG. 13, clockwise rotation of the cover 111 to effectuate engagement of the fuel tank cap 110 with the fuel tank filler spout brings the inclined surfaces 148 of the ratchet teeth 146 into engagement with the ridges 80 on barrel assembly 119. The ridges 80, being only slightly flexible, are carried with the rotation of the latching ring 132 by the inclined surfaces 148 of the ratchet teeth 146 until the cap 110 has been tightened to a predetermined degree relative to the fuel tank inlet. When sufficiently tight, the force of resistance to further engagement of the threads 120 with the fuel tank filler inlet is transferred the length of the barrel assembly 119 so that a torsional force opposing further engagement acts between the ratchet teeth 146 and the ridges 80. The ridges 80 are resilient enough to yield under this force to allow passage of the ratchet 146 so that the inclined surfaces 148 force the ridges 80 out of the path of the teeth 146. When this limit of force is reached, the barrel assembly 119 can be engaged no further relative to the filler tank inlet, although the cover 111 with the skirt 112 carrying the latching ring 132 may be rotated. This rotation is not accompanied by engagement of the ratchet teeth 146, which merely pass over the ridges 80.

Counter-rotation of the cover 111 can be accomplished however. When the latching ring 132 is carried in a counterclockwise direction as viewed in FIG. 13, it is the radial surfaces 147 which engage the ridges 80 instead of the inclined surfaces 148. Thus, since the ridges 80 are somewhat resilient, the ratchet teeth 146 dig into the ridges slightly thereby carrying the collar 40 and barrel assembly 119 in counterclockwise rotation to effectuate disengagement of the fuel tank cap 110 from a fuel tank filler inlet. As a result, the clutch mechanism of FIG. 13 allows disengagement in a single direction only once an upper limit of torsional force acts between the barrel assembly 119 and the fuel tank cap cover 111. The clutch mechanism is not disengaged by counterclockwise rotation of the cover 111 so that the barrel assembly 119 never becomes permanently lodged in the fuel tank filler inlet.

The self locking feature of the gas cap of the present invention is accomplished in an identical manner both with the gas cap 10, depicted in FIGS. 1-9, and with the gas cap 110 depicted in FIGS. 10-14. The principal difference in the two embodiments is the type of locking mechanism utilized and the gas cap profile.

The self locking feature of both may be explained with reference to the operation of the gas cap 10, which is manipulated in the following manner. With the cap 10 in position in threaded engagement with a filler tank inlet, a key is inserted into the key slot 24 in the cylinder 23 in FIG. 1. The key is turned counterclockwise about 90 degrees, rotating the cylinder 23 with it. Rotation of the cylinder 23 causes the crank pin 24 to act on the walls of the aperture 25 to shift the lug 17 from the stable locking position depicted in FIG. 4 to the unstable unlocking position in FIG. 5. For the lug 17 to reach this unstable position, movement of the crank pin 24 causes the restraining tooth 34 to deflect the restraining spring leg 37 to cause it to ride up and over the tooth 34 until the bearing surface 39 of the foot 38 of the restraining leg 37 bears against the inclined surface of the restraining tooth 34 as depicted in FIGS. 5 and 8. Meanwhile, the impelling biasing leg 35 exerts a force against the impelling tooth 33 in opposition to the restraining leg 37. However, the bearing surface 39 of the foot 38 of restraining leg 37 is seated with sufficient solidity to prevent unaided movement of the lug 17 back to the locking position of FIG. 4.

The key may then be rotated back to center and removed from the key slot 24, but the restraining leg 37 of the spring 18 holds the lug 17 in the unstable unlocking position. The fuel cap 10 may be removed from the fuel tank inlet by turning the cover 11 by hand in counterclockwise rotation as viewed in FIGS. 1 and 8. Rotation of the cover 11 in this manner rotates the lug 17 so that the bearing ledge 29 of the end 27 of lug 17 is brought into contact with one of the catches 21 of the latching ring 32, as depicted in FIG. 8. The coaction between the catch 21 and bearing ledge 29, following a second coaction means, thereafter causes the barrel assembly 19 to turn with the cover 11 so that the cap 10 may be totally disengaged from the fuel tank inlet.

Once fuel has been introduced into the tank and it is desired to replace the cap on the tank inlet, the cap 10 is brought into position with the annular skirt 12 encircling the mouth of the fuel tank. The cover 11 is then rotated in a clockwise direction to initiate engagement of the threaded portion 20 of the barrel assembly with the fuel tank filler spout. This carries the end 27 of lug 17 in a clockwise direction away from the catch 21 in FIG. 8 with which it had previously been engaged, and into contact with another catch 21. This time, however, because of the different direction of rotation, the catch 21 is not brought into contact with the bearing ledge 29, but rather is brought into contact with the curved surface 31 forming a first coacting means. The surface 31 acts as a cam on the lug 17 to aid the action of the impelling spring leg 35 and force the lug 17 inward from the unstable unlocking position of FIG. 8 to the stable locking position of FIG. 6. As the lug 17 is shifted the foot 38 of the restraining spring leg 37 rides over the crest of the restraining tooth 34 so that the bearing surface 39 no longer is in direct contact with the restraining tooth. As clockwise rotation of the cover 11 is continued, the lug 17 reaches a position where the bearing ledge 28 of the end 26 of lug 17 engages one of the catches 21, as depicted in FIG. 6. The barrel assembly 19 is thereafter carried in clockwise rotation by the lug 17 until it is firmly engaged with the fuel inlet cap. When this occurs, the O-ring 49 effectuates a seal between the cap 10 and fuel inlet filler spout to prevent the escape of fuel vapors.

Overtightening of the cap 10 is prevented by the clutch mechanism of the invention. That is, as movement of the cover 11 is continued in a clockwise direction, as viewed in FIG. 9, a point is reached at which the cap 10 is thoroughly engaged with the fuel inlet filler spout and a great deal of resistance occurs between the mating threads 20 of the barrel assembly 19 and the opposing threads on the fuel tank inlet. This creates torsional force which, upon reaching a predetermined limit, actuates the clutch mechanism of the invention. Clockwise rotation of the cover 11 at this point may be continued, but the resistance of the barrel assembly 19 causes the teeth 41 in FIG. 9 to deflect so that their tips 42 ride up the inclined surfaces 48 of the mating ratchet teeth 46 and are thereby disengaged therefrom. Thus, clockwise rotation of the cover 11 can continue but no further engagement of the barrel assembly 19 with the fuel inlet will occur.

It should be noted that once the lug 17 has been shifted from its unstable unlocking position to its stable locking position, any counterclockwise rotation of the cover 11 will not cause engagement between any of the catches 21 and either of the bearing ledges 28 or 29. The reason for this is that in this position the bearing ledge 29 has been shifted radially inward relative to the latching ring 32 so that it can not be engaged by any of the catches 21. The catches 21 do strike the opposing end 26 of the lug 17, as illustrated in FIG. 7, but contact occurs between the catches 21 and the curved surface 30 so that the lug 17 is moved slightly inward toward the axial center of the barrel assembly 19 in a camming movement each time a catch 21 makes contact with the surface 30. Once a catch 21 passes the end 26, the impelling leg 35 of the spring 18 pushes the lug 17 outward to its locking position again. The lug 17 is again cammed inward each time it passes the next catch 21.

The resulting possible movements of the barrel assembly 19 relative to the cover 11 may be described as follows. When the lug 17 is in the unstable unlocking position of FIG. 8, counterclockwise rotation of the cover 11 relative to the barrel assembly 19 will cause engagement therebetween by virtue of engagement between a catch 21 and the bearing surface 29 of end 27 of lug 17. The relative positions of the lug 17 and catches 21 in this condition are, as illustrated in FIG. 8, and this is the condition that would prevail during removal of the cap 10 from a fuel inlet filler spout. Thereafter, clockwise rotation of the cover 11 to replace the cap will bring the curved surface 31 into contact with a catch 21, which will aid the impelling spring leg 35 to shift the lug 17 from the unstable unlocking position of FIG. 8 to the stable locking position of FIG. 4. Continued clockwise rotation of the cover 11 as illustrated in FIG. 6 will cause engagement between the bearing surface 28 of end of lug 17 and a catch 21.

With the lug 17 initially in the stable locking position of FIG. 6, counterclockwise rotation of the cover 11 will result in each of the catches 21 sequentially contacting the curved surface 30 and forcing the lug 17 slightly inward as the catch 21 rides over this curved surface, as illustrated in FIG. 7. The lug 17 will spring back to the locking position of FIG. 6 following the passage of each catch 21. Clockwise rotation of the cover 11, on the other hand, will cause engagement of a catch 21 against the bearing surface 28 and the barrel assembly 19 will thereby be rotated in a clockwise direction until and unless the clutch mechanism is actuated. Operation of the clutch mechanism is illustrated in FIG. 9 and has previously been explained.

The lock mechanism of the gas cap 110 differs from that of the gas cap 10, although the function of the embodiments is essentially the same. To unlock the gas cap 110, the key 62 is lowered onto the pan-shaped structure 70 with the lower circular face 63 of the key 62 in contact with surface 67 of the pan-shaped structure 70 with the stud 66 aligned with the groove 65. The key 62 is then rotated counterclockwise carrying with it the pan-shaped structure 70, as viewed in FIG. 11 until the boss 76 moves from the position of FIG. 12 counterclockwise to the opposite extremity of the track 77. Rotation of the pan-shaped structure 70 is possible because the magnets within the key 62 are initially located directly above the depressions 71 in the underside of the pan-shape structure 70. The key magnets repel the magnets 69, forcing them downward against the spring bias. This permits the pan-shaped structure 70 to be turned counterclockwise to the limit allowed by the interaction of the boss 76 and the track 77.

When the key is removed, the rotation that has occurred has carried the depressions 71 to positions offset relative to the magnets 69 within the drum shaped housing 73. Thus, the magnets 69 can no longer rise to engage the depressions 71 and immbolize the pan-shaped structure 70. By rotating the pan-shaped structure 70 counterclockwise to the limit permitted by the track 77, the shaft 75 operates the crank pin 124 to carry the lug 117 from the stable locking position to the unstable unlocking position. Thereafter, rotation of the cover 111 to disengage the cap 110 from the filler tank inlet results in movement of the lug 117 in a manner identical to that depicted with respect to the lug 17 in FIG. 8, when it is rotated in the direction of the arrow of FIG. 8.

Once the cap 110 has been removed from the filler tank inlet, and re-engagement therewith is desired, the cover 111 is rotated in the opposite direction. This results in movement of the lug 117 from the unstable unlocking position of FIG. 14, and as explained with reference to lug 17 in FIG. 8, to the stable locking position depicted in FIG. 6. Movement of the lug 117 in this manner to the left from the position depicted in FIG. 14 carries the crank pin 124 with it. This in turn rotates the crank arm 77 counterclockwise in FIG. 14, thus carrying the shaft 75 with the boss 76 thereon back to the position depicted in FIG. 12. In this position, provided the key 62 has been removed, the magnet 69 are forced outward by spring bias and seat themselves in the depressions 71, thereby locking the pan-shaped structure 70 to the annular drum-shape housing 73. Once locked in this manner, disengagement of the cap 111 from the filler tank inlet is no longer possible, as the lug 117 will not carry the latching ring 132. Rather, the lug 117 will merely be cammed radially inward as its curved surface 130 rides against the catches in latching ring 132.

Upon total re-engagement of the self locking gas gap 110 with a filler tank inlet and upon reaching the predetermined upper limit of torsional force, the clutch mechanism will be actuated previously explained with reference to FIG. 13.

It should be understood that the particular embodiment of the apparatus depicted herein is but a single form of the invention. Various alterations and modifications will undoubtedly become readily apparent to those familiar with locking fuel tank caps. Accordingly, the single form of the structure depicted should not be considered as limiting, but rather the invention is defined in the claims appended hereto.

I claim:

1. A self locking vehicle fuel tank cap for use with an annular threaded fuel inlet comprising:
   a cover having annular walls for encircling said fuel tank inlet in coaxial fashion and having a transverse enclosing end member extending thereacross and equippped at the interior surface thereof with a guideway defining a transverse path adjacent to said end member and intersecting the cover axis;
   a transverse lug disposed for longitudinal movement in said guideway between a longitudinally displaced unstable unlocking position and a stable locking position;
   resilient biasing means for driving said lug toward said stable locking position and having means for urging said lug from said unlocking to said locking position and means for opposing unaided movement of said lug from said unlocking to said locking position;
   a central core assembly threaded for coaxial engagement with said fuel tank inlet and having transverse interiorly directed radial projection means extending from the perimeter thereof aligned for coaction with said lug, including first coaction means relative rotation of said lug and said projection means in one direction with said lug initially in said unlocking position causes said projection means to force said lug from said unstable unlocking position to said stable locking position thereby overcoming said means for opposing unaided movement; and including second coaction means whereby relative rotation of said lug and said projection means in the opposite direction of rotation with said lug initially in said unlocking position causes said lug to engage said projection means for rotation therewith, and relative rotation of said lug and said projection means otherwise causes engagement therebetween for rotation together in only said one direction.

2. The vehicle fuel tank cap of claim 1 further characterized in that:
   an axially aligned aperture is formed in said end member and said cover carries a cylinder that accomodates a key insertable therein externally of said cover and rotatable together within said aperture and an interiorally directed eccentric crank pin extends inwardly from said cylinder;
   an oversize aperture is defined in said lug for receiving said crankpin, whereby said key is employed to drive said crankpin in eccentric motion to carry said lug from said stable locking position to said unstable unlocking position.

3. The vehicle fuel tank cap of claim 1 further characterized in that said lug has first and second opposing contoured ends each having a curved camming surface and an adjacent bearing ledge, whereby said projection means is able to cam said lug radially inward during relative movement therebetween by coaction with each of said camming surfaces while moving in opposite directions of rotation, when said lug is positioned to allow contact therebetween and said projection may be engaged with each of said bearing ledges when movement is initiated in opposite directions of rotation when said lug is positioned to allow contact therebetween.

4. The vehicle fuel tank cap of claim 1 further characterized in that said central core assembly includes:
   an interior threaded portion having a longitudinal extremity proximate to said end member of said cover with radially outwardly directed ratchet teeth having intermediate generally arcuate portions mounted in deflectable canitilever fashion; and
   a peripheral latching ring having opposing surfaces and carrying said projection means on one of said surfaces at the circumferential limits thereof and carrying radially interiorly directed ratchet teeth engageable with said deflectable ratchet teeth of said threaded portion, whereby said interior threaded portion and said peripheral latching ring are engaged until excessive torsion therebetween deflects said outward directed teeth to cause disengagement.

5. The vehicle fuel cap of claim 4 further characterized in that an O-ring is provided in disposition about said interior threaded portion of said central core assembly for coaction with said annular threaded fuel inlet to effectuate sealing therebetween.

6. A fuel cap for threadable engagement with a vehicle fuel tank inlet comprising:
   a cover having an annular wall encompassing the outer extremity of said fuel inlet and having a transverse guideway in diametral disposition relative thereto;
   a lug having opposite ends with opposing bearing surfaces for transverse movement in said guideway for shifting between an unstable unlocking position in which a bearing surface at one of said ends is moved toward said annular wall of said cover, and a stable locking position in which an opposing bearing surface at said opposite end of said lug is moved toward said annular wall of said cover;

a lock mechanism actuable to shift said lug into said unstable unlocking position;

biasing means for retaining said lug in said unstable position until release, and for otherwise biasing said lug toward said stable locking position;

a central core threadably engageable with said fuel inlet and including latching means for engaging said lug in said unstable position during relative rotation therebetween in one direction to loosen said core relative to said fuel tank inlet, and for moving said lug from said unstable to said stable position during relative rotation therebetween in the opposite direction, and for thereafter engaging said lug to tighten said core relative to said fuel tank inlet.

7. A fuel cap according to claim 6 further characterized in that said lug is an oblong member movable longitudinally in said guideway and having a lateral impelling protrusion for engagement by said biasing means to shift said lug to said stable locking position and having a lateral restraining protrusion for engagement by said biasing means to maintain said lug in said unstable unlocking position when said lug is so shifted by said lock mechanism and said biasing means includes an impelling biasing member engageable with said impelling protrusion and a restraining biasing member engageable with said restraining protrusion, whereby said projection means disengages said restraining biasing member from said restraining protrusion only when said lock mechanism has been actuated to initially shift said lug into said unstable unlocking position and said central core is rotated to tighten said core relative to said fuel inlet.

8. The fuel cap according to claim 7 further characterized in that said impelling biasing member is a spring metal leg immobilized at one end relative to a fulcrum on said cover and extending to ride freely in contact with said impelling protrusion in a deflected condition to urge said lug in one direction within said guideway toward said stable locking position, and said restraining biasing member is a linear spring metal leg immobilized at one end relative to a fulcrum on said cover and extending to an opposite end deformed to provide a bearing surface against which said impelling biasing member forces said restraining protrusion when said lug is in said unstable unlocking position, and said restraining biasing member is deflected to ride over said restraining protrusion when said latching means moves said lug from said unstable to said stable position.

9. A fuel cap according to claim 6 further characterized in that said lug is an oblong member having opposing ends each contoured to define a camming surface and a bearing ledge arranged such that rotation of said core in one direction relative to said cover results in contact by said latching means with said camming surface of a first one of said ends of said lug and with said bearing ledge of said opposing end of said lug, when said lug is positioned to allow contact therebetween, and rotation of said core in the opposite direction relative to said fuel inlet results in contact by said latching means with said bearing ledge of said first one of said ends of said lug.

10. A fuel cap according to claim 6 further characterized in that said central core includes a clutch mechanism that engages said cover with said central core up to an upper limit of torsional force therebetween and disengages said central core from said cover when said torsional force exceeds said upper limit.

11. The fuel cap of claim 10 further characterized in that clutch mechanism includes first and second concentric members, and said first member includes a plurality of elongated teeth mounted in cantilever fashion to said first member and extending in generally arcuate configurations and terminating in radially disposed extremities, and said second concentric member includes a plurality of radially directed teeth disposed in opposing orientation to engage said elongated teeth up to said upper limit of torsional force and to disengage therefrom when said torsional force exceeds said upper limit.

12. The fuel cap of claim 10 further characterized in that said clutch mechanism includes first and second concentric members, and said first member includes a plurality of arcuate ridges mounted upon one of said concentric members, and said other concentric member includes a plurality of radially directed teeth disposed in opposing orientation to engage said ridges up to said upper limit of torsional force and to disengage therefrom when said torsional force exceeds said upper limit in a single direction of rotation.

13. A fuel cap according to claim 6 further characterized in that said lock mechanism includes a magnetic lock in which a key carrying magnets in an encoded array is positioned proximate to and in mutual alignment with corresponding magnets in said lock mechanism to repel said corresponding magnets to permit relative rotational displacement of adjacent members thereby unlocking said lock mechanism.

* * * * *

Disclaimer 4,132,091.—*Ernesto M. Aro* Wilmington; *Donald J. Shanklin*, Fullerton, both of Calif. SELF LOCKING FUEL CAP. Patent dated Jan. 2, 1979. Disclaimer filed Mar. 29, 1989, by the assignee, Mr. Gasket Co.

Hereby enters this disclaimer to the entire term of said patent.
[*Official Gazette June 27, 1989*]